United States Patent
Mobley et al.

(10) Patent No.: US 8,498,074 B1
(45) Date of Patent: Jul. 30, 2013

(54) DISK DRIVE CHOOSING COMMAND FROM COMMAND QUEUE BASED ON A WINDOW DEFINED BY A PROBABILITY OF A SEEK MISS

(75) Inventors: Jack A. Mobley, Oklahoma City, OK (US); Kenny T. Coker, Firestone, CO (US); Orhan Beker, Aliso Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 165 days.

(21) Appl. No.: 13/212,901

(22) Filed: Aug. 18, 2011

Related U.S. Application Data

(60) Provisional application No. 61/385,912, filed on Sep. 23, 2010.

(51) Int. Cl.
- *G11B 5/02* (2006.01)
- *G06F 13/00* (2006.01)
- *G06F 13/28* (2006.01)

(52) U.S. Cl.
USPC .............................. 360/55; 711/112; 711/158

(58) Field of Classification Search
None
See application file for complete search history.

(56) References Cited

U.S. PATENT DOCUMENTS

| | | |
|---|---|---|
| 4,899,234 A | 2/1990 | Genheimer |
| 5,383,068 A | 1/1995 | Shimizu et al. |
| 5,570,332 A | 10/1996 | Heath et al. |
| 6,101,065 A | 8/2000 | Alfred et al. |
| 6,111,720 A | 8/2000 | Clare et al. |
| 6,170,042 B1 | 1/2001 | Gaertner et al. |
| 6,191,912 B1 | 2/2001 | Gaertner et al. |
| 6,195,222 B1 | 2/2001 | Heminger et al. |
| 6,339,811 B1 | 1/2002 | Gaertner et al. |
| 6,445,531 B1 | 9/2002 | Gaertner et al. |
| 6,496,877 B1 | 12/2002 | Greenberg et al. |
| 6,515,819 B1 | 2/2003 | Schmidt et al. |
| 6,597,528 B1 | 7/2003 | Pang et al. |
| 6,604,178 B1 | 8/2003 | Hall |
| 6,657,811 B1 | 12/2003 | Codilian |
| 6,681,289 B2 | 1/2004 | Espeseth et al. |
| 6,754,036 B2 | 6/2004 | Dehnert |
| 6,763,404 B2 | 7/2004 | Berning et al. |
| 6,809,896 B2 | 10/2004 | Espeseth et al. |
| 6,859,859 B2 | 2/2005 | Hall |
| 6,892,250 B2 | 5/2005 | Hoskins |

(Continued)

FOREIGN PATENT DOCUMENTS

WO   WO/2004/023458 A1   3/2004

*Primary Examiner* — Daniell L Negron

(57) ABSTRACT

A disk drive is disclosed wherein a plurality of access commands received from a host are stored in a command queue. An access cost for at least a first and second access command in the command queue is generated, wherein each access cost comprises a seek length and a rotation latency. A first access command is selected from the command queue having a first access cost, and a window is defined relative to the first access cost and a first risk based penalty (RBP) of the first access command, wherein the first RBP represents a probability of missing a first data sector of the first access command. A second access command is selected from the command queue comprising a second access cost within the window. A choice is made between the first and second access commands in response to a second RBP of the second access command.

14 Claims, 6 Drawing Sheets

U.S. PATENT DOCUMENTS

| | | |
|---|---|---|
| 6,937,431 B2 | 8/2005 | Galloway |
| 6,968,422 B1 | 11/2005 | Codilian et al. |
| 7,003,644 B2 | 2/2006 | Heath et al. |
| 7,010,653 B2 * | 3/2006 | Uchida et al. ................. 711/158 |
| 7,043,567 B2 | 5/2006 | Trantham |
| 7,088,538 B1 | 8/2006 | Codilian et al. |
| 7,089,355 B2 * | 8/2006 | Auerbach et al. ............. 711/112 |
| 7,199,966 B1 | 4/2007 | Tu et al. |
| 7,471,486 B1 | 12/2008 | Coker et al. |
| 7,644,206 B2 | 1/2010 | Lawson et al. |

* cited by examiner

| SEEK LENGTH | ROTATION LATENCY | COUNTS | MISSES | RBP |
|---|---|---|---|---|
| 1-L1 | 1-R1 | 10 | 2 | 20 |
| | R1-R2 | 100 | 18 | 18 |
| | R2-R3 | 75 | 6 | 8 |
| | R3-R4 | 152 | 3 | 2 |
| L1-L2 | 1-R1 | 60 | 29 | 48 |
| | R1-R2 | 85 | 18 | 21 |
| | R2-R3 | 36 | 6 | 17 |
| | R3-R4 | 92 | 3 | 3 |
| L2-L3 | 1-R1 | 45 | 13 | 29 |
| | R1-R2 | 22 | 5 | 23 |
| | R2-R3 | 57 | 6 | 11 |
| | R3-R4 | 15 | 1 | 7 |
| L3-L4 | 1-R1 | 23 | 12 | 52 |
| | R1-R2 | 120 | 32 | 27 |
| | R2-R3 | 39 | 7 | 18 |
| | R3-R4 | 75 | 4 | 5 |

RBP = (MISSES/COUNTS) * NUMBER SERVO WEDGES

DISK DRIVE CHOOSING COMMAND FROM COMMAND QUEUE BASED ON A WINDOW DEFINED BY A PROBABILITY OF A SEEK MISS

The present application claims priority from provisional U.S. Patent Application Ser. No. 61/385,912, filed on Sep. 23, 2010, the specification of which is incorporated herein by reference.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3).

The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Multiple access commands may be received from the host while the disk drive is executing a current access command. The access commands are typically buffered in a command queue, and when the disk drive is finished executing the current command, a next command is chosen from the command queue according to a rotational position optimization (RPO) algorithm. The RPO algorithm attempts to choose the next command that will minimize the mechanical latency in accessing the disk, including the seek time required to move the head to the target track and the rotation time for the head to reach the target data sector.

DETAILED DESCRIPTION OF EMBODIMENTS OF THE INVENTION

Figure 1:
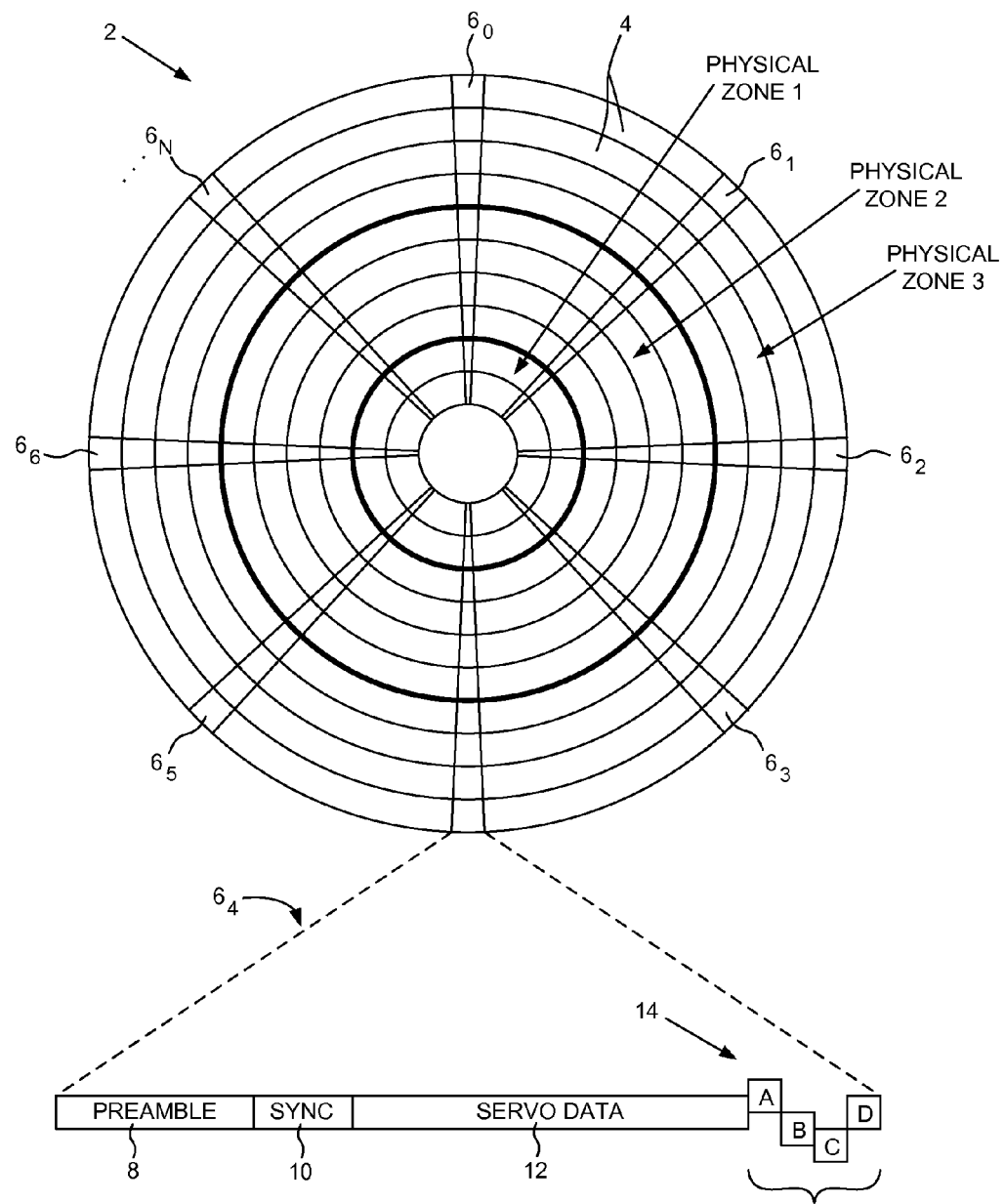
FIG. 1 shows a prior art disk format comprising a plurality of servo sectors defining a plurality of data tracks.
Figure 2:
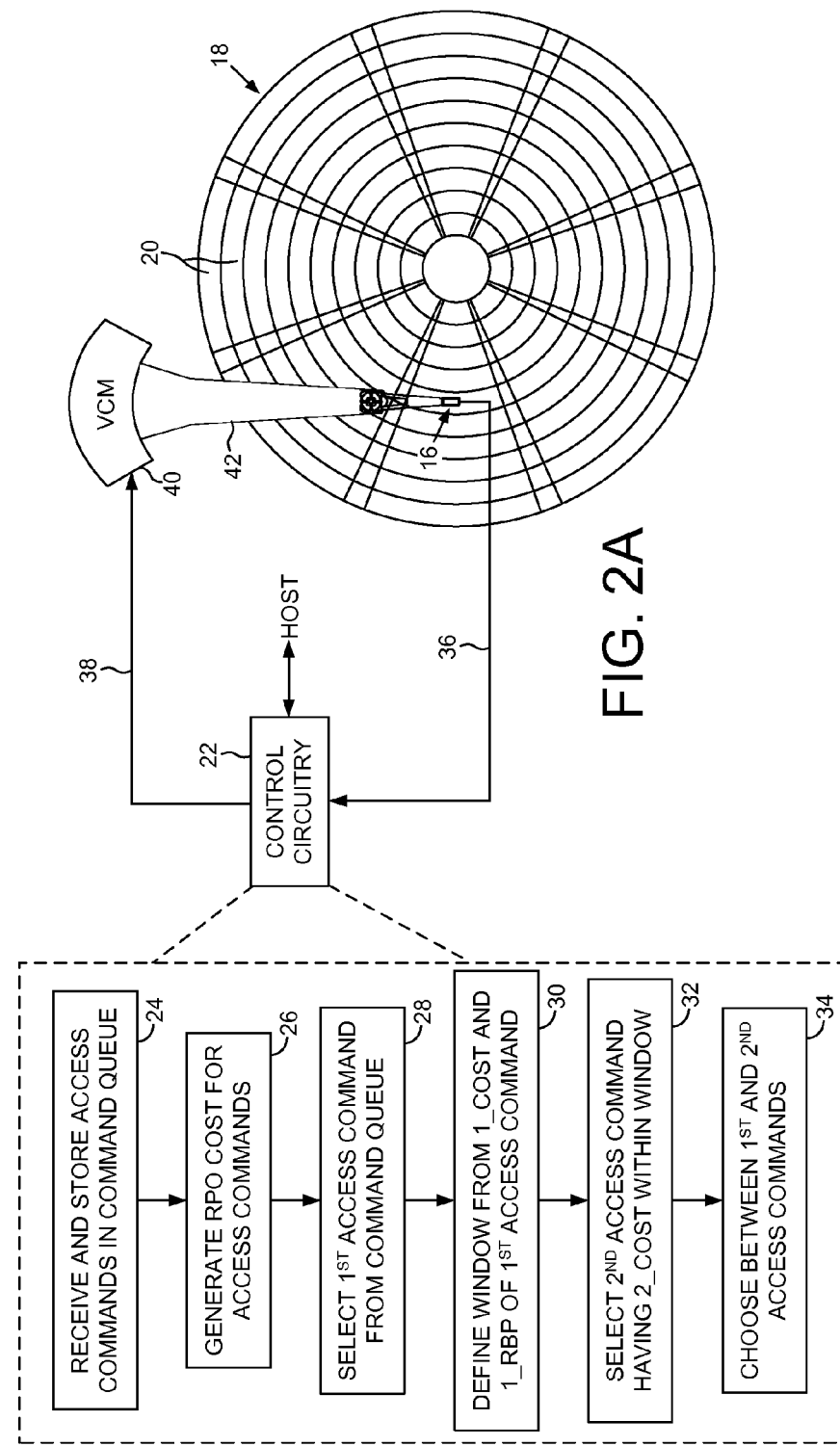
FIG. 2A shows a disk drive according to an embodiment of the present invention comprising a head actuated over a disk.
FIG. 2B is a flow diagram according to an embodiment of the present invention for choosing a next access command to execute based on a window defined by a seek/rotation cost and a risk based penalty (RBP) representing a probability of slipping a revolution.

FIG. 2A shows a disk drive comprising a head 16 actuated over a disk 18 comprising a plurality of tracks 20, wherein each track comprises a plurality of data sectors and a plurality of servo sectors. The disk drive further comprises control circuitry 22 operable to execute the flow diagram of FIG. 2B wherein a plurality of access commands are received from a host and stored in a command queue (step 24). An access cost is generated for at least a first and second access command in the command queue, wherein each access cost comprises a seek length and a rotation latency (step 26). A next access command to execute is chosen from the command queue by selecting a first access command from the command queue having a first access cost (step 28). A window is defined relative to the first access cost and a first risk based penalty (RBP) of the first access command, wherein the first RBP represents a probability of missing a first data sector of the first access command (step 30). A second access command is selected from the command queue comprising a second access cost within the window (step 32). A choice is made between the first access command and the second access command in response to a second RBP of the second access command, wherein the second RBP represents a probability of missing a first data sector of the second access command (step 34).

In the embodiment of FIG. 2A, the disk 18 comprises a plurality of servo sectors that define the plurality of data tracks 20, wherein each data track comprises a plurality of the data sectors. The control circuitry 22 processes a read signal 36 to demodulate the servo sectors into a position error signal (PES). The PES is filtered with a suitable compensation filter to generate a control signal 38 applied to a voice coil 40 of a voice coil motor (VCM) which pivots an actuator arm 42 about a pivot to position the head 16 radially over the disk 18 in a direction that reduces the PES.

Figure 3:
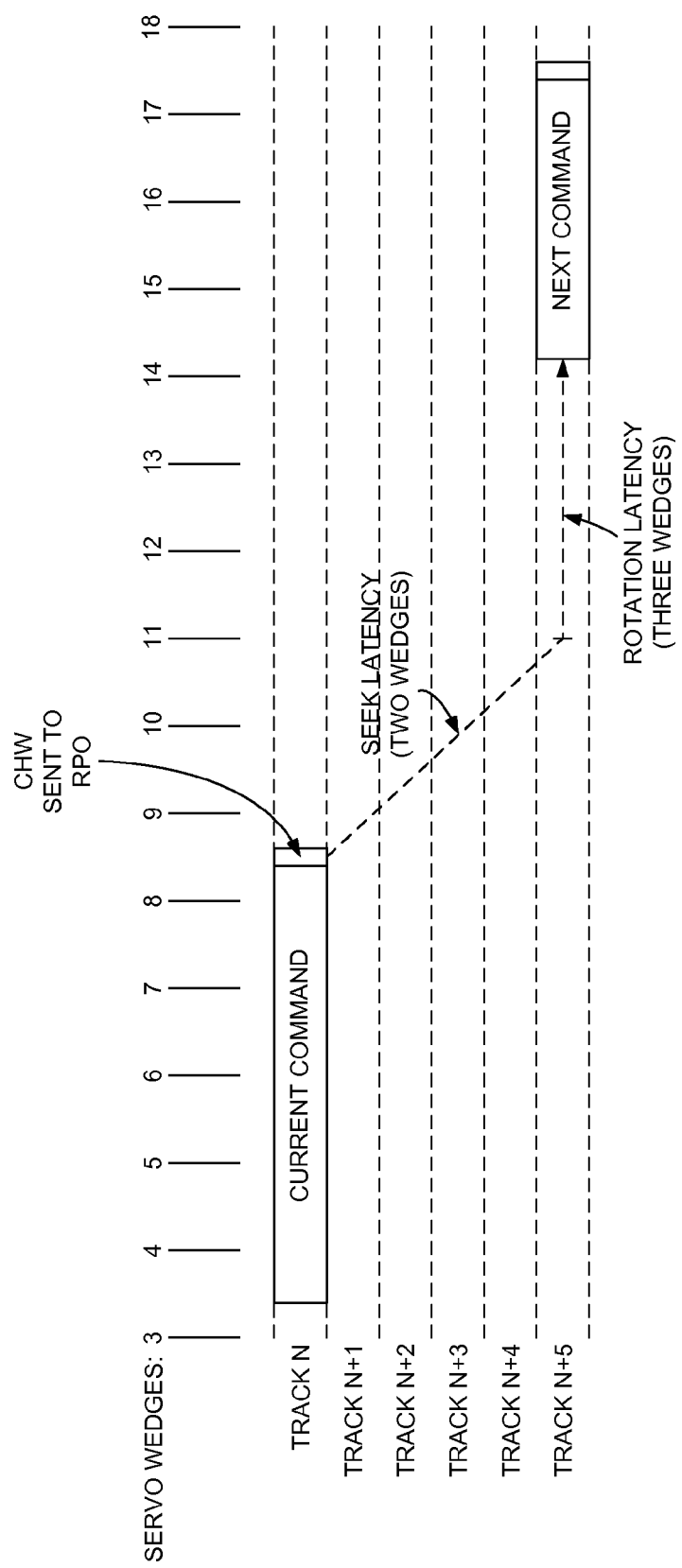
FIG. 3 illustrates a seek/rotation cost for a next command relative to a current command according to an embodiment of the present invention.

FIG. 3 illustrates a current access command being executed at track N and a next access command to execute at track N+5. Accordingly, there is an access cost including a seek latency (two servo wedges in this example) associated with positioning the head over track N+5 as well as a rotation latency (three servo wedges in this example) associated with waiting for the head to reach the first data sector of the next access command. In one embodiment, a rotation position optimization (PRO) algorithm evaluates the access cost of each access command in the command queue in order to choose the next access command to execute.

Choosing the access command having the minimal access cost does not always provide the best performance in terms of throughput if the access cost estimated for a chosen access command is incorrect leading to a slipped revolution. That is, if the head reaches the target data track too late such that the first data sector of an access command is missed, the control circuitry typically must wait a revolution in order to execute the access command. The additional latency of a slipped revolution is typically greater than the latency of a different access command having a greater access latency but a higher probability of reaching the target track on time (RBP). Accordingly, in the embodiments of the present invention the RPO algorithm chooses the next access command to execute by evaluating the access cost as well as a RBP associated with the access commands in the command queue.

The RBP may be generated for an access command in the command queue in any suitable manner. In one embodiment, the access cost (seek/rotation latency) is generated as a number of servo wedges defined by the servo sectors (a servo wedge being the time between consecutive servo sectors). The RBP may also be generated as a number of servo wedges, or any other metric such as a suitable statistical value.

Figures 4A, 4B, 4C:
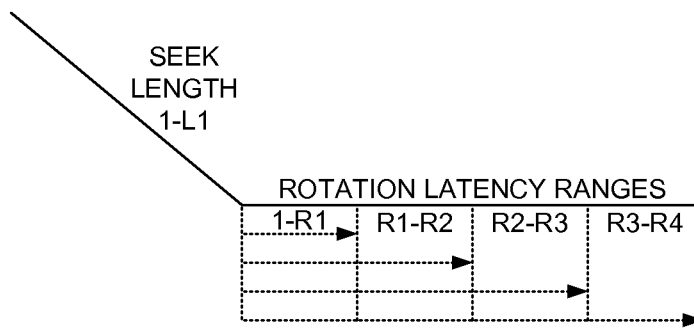
FIGS. 4A and 4B show an embodiment of the present invention wherein a RBP is generated and updated for a plurality of seek length ranges, and for a plurality of rotation latency ranges.
FIG. 4C shows an embodiment of the present invention wherein the RBP is generated relative to a ratio of seek misses/total seeks times the number of servo sectors in a track.

FIGS. 4A and 4B illustrate an embodiment of the present invention for generating the RBP 52 for an access command. In this embodiment, a lookup table is generated comprising a range of seek lengths 44, wherein each seek length range comprises a number of rotation latency ranges 46. Each rotation latency range corresponds to an estimated rotation latency that may be associated with an access command as illustrated in FIG. 4B. Accordingly, when the RPO algorithm computes the access cost for an access command in the command queue, the estimated seek length and rotation latency is used to index the table of FIG. 4A in order to lookup the corresponding RBP.

In one embodiment, the RBP 52 for each entry in the table of FIG. 4A is generated based on a ratio of seek misses 50 to the total number of seeks 48 for the seek length range and the rotation latency range, wherein a seek miss occurs when the first data sector of an access command is missed (leading to a slipped revolution). Each time an access command is executed, the corresponding entry in the table of FIG. 4A is updated based on the result of executing the access command, including to update the corresponding RBP for the seek length range and rotation latency range. In this embodiment, the RBP may be continuously adapted over the life of the disk drive to account for changes that may occur over time.

In the embodiment of FIG. 4A, the RBP is generated according to an equation shown in FIG. 4C. The RBP is computed based on a ratio of the number of seek misses to the total number of seeks for the seek length range and the rotation latency range. The ratio is then multiplied by the total number of servo wedges over a revolution of the disk (in the example of FIG. 4A, the disk comprises 100 servo wedges). FIG. 4A illustrates that the number of seek misses decreases as the rotation latency range increases (since the head is reaching the target track earlier). Any suitable number of rotation latency ranges may be tracked, wherein the probability of a seek miss will eventually become negligible as the rotation latency increases beyond some limit.

Figure 5A:
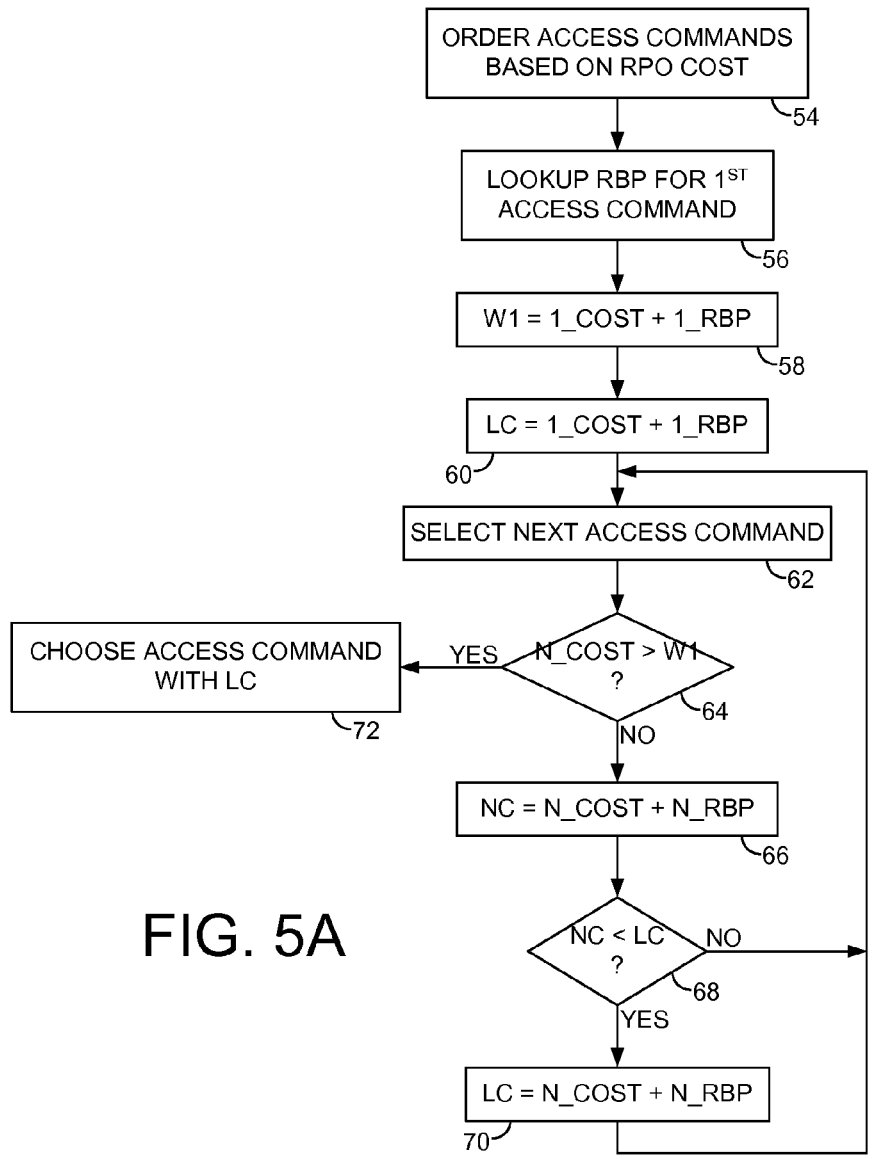
FIGS. 5A and 5B illustrate an embodiment of the present invention wherein a second access command is chosen over a first access command if its cost plus RBP is less then the cost plus RBP of the first access command.

The RBP may be used in any suitable manner by the RPO algorithm to choose a next access command to execute. FIG. 5A is a flow diagram according to an embodiment of the present invention wherein the access commands are ordered in the command queue based on the access cost (step 54). The RBP for the first access command in the command queue (the access command having the smallest access cost) is generated (step 56) such as through a lookup table as shown in FIG. 4A. A window is then defined as the access cost plus the RBP of the first access command (step 58), and a low cost (LC) variable is initialized to the length of the window (step 60). A next access command is then selected from the command queue (step 62). If the access cost of the selected access command falls within the window (step 64), a next cost (NC) variable is assigned to the access cost plus the RBP of the selected access command (step 66). If the NC is less than the LC (step 68), the LC is assigned to the access cost plus the RBP of the selected access command (step 70). The process is then repeated for the next access command in the command queue until the access cost of the selected access command is greater than the window (step 64). The next access command chosen for execution corresponds to the access command assigned to the LC (step 72).

Figure 5B:
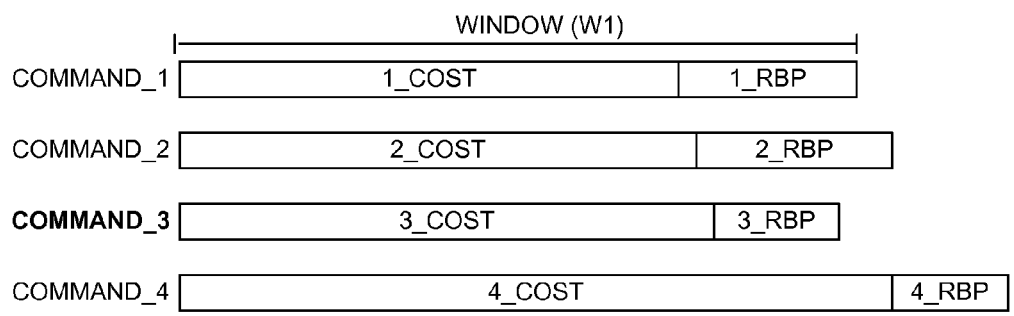

FIG. 5B illustrates an example of the flow diagram of FIG. 5A, wherein the access commands are ordered based on increasing access cost. The window (W1) is then defined as the access cost plus the RBP of the first access command (COMMAND_1). The access cost of the next access command (COMMAND_2) falls within the window W1, but the access cost plus the RBP is greater than COMMAND_1 so it is not chosen. The access cost of the next access command (COMMAND_3) falls within the window W1, and since its access cost plus the RBP is less than COMMAND_1, it is chosen over COMMAND_1. The process then terminates at COMMAND_4 since it has an access cost that exceeds the window W1. In the example of FIG. 5B, COMMAND_3 is chosen over COMMAND_1 even though it has a greater access cost since a seek miss is less likely when executing COMMAND_3 as compared to COMMAND_1.

Figure 6A:
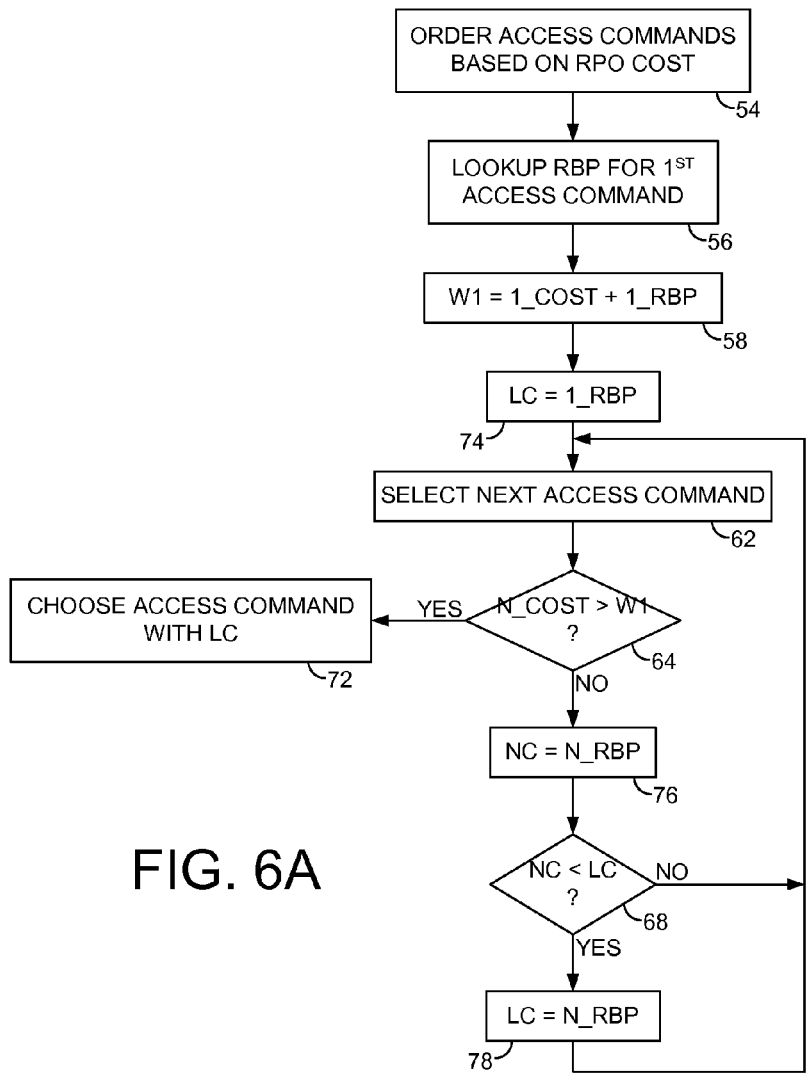
FIGS. 6A and 6B illustrate an embodiment of the present invention wherein a second access command is chosen over a first access command if its RBP is less then the RBP of the first access command.

FIG. 6A is a flow diagram according to an embodiment of the present invention wherein the LC variable is initially assigned to the RBP of the first access command (step 74). When a later selected access command has an access cost that falls within the window (step 64), the NC variable is assigned to the RBP of the selected access command (step 76). If the NC is less than the LC (step 68), the LC is assigned to the RBP of the selected access command (step 78) and the process is repeated until the access cost of the selected access command is greater than the window (step 64). The next access command chosen for execution corresponds to the access command assigned to the LC (step 72).

Figure 6B:
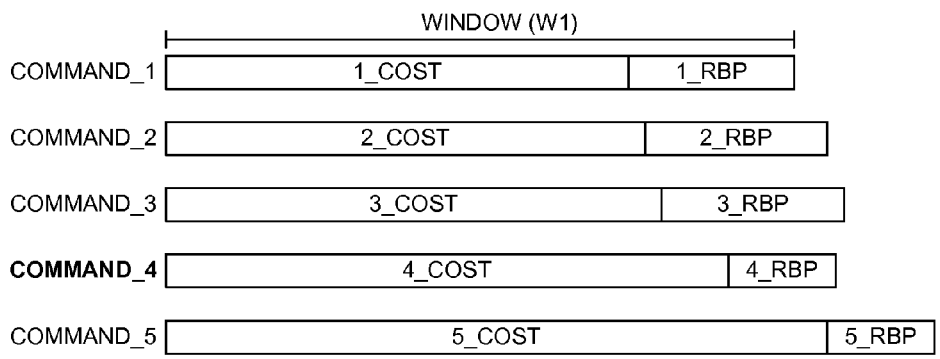

FIG. 6B illustrates an example of the flow diagram of FIG. 6A, wherein the access commands are ordered based on increasing access cost. The window (W1) is then defined as the access cost plus the RBP of the first access command (COMMAND_1). The access cost of the next access command (COMMAND_2) falls within the window W1, but its RBP is greater than the RBP of COMMAND_1 so it is not chosen. The access cost of the next access command (COMMAND_3) falls within the window W1, but its RBP is also greater than the RBP of COMMAND_1 so it is not chosen. The access cost of the next access command (COMMAND_4) falls within the window W1, and since its RBP is less than the RBP of COMMAND_1, it is chosen over COMMAND_1. The process then terminates at COMMAND_5 since it has an access cost that exceeds the window W1. In the example of FIG. 6B, COMMAND_4 is chosen over COM- MAND_1 even though it has a greater access cost since a seek miss is less likely when executing COMMAND_4 as compared to COMMAND_1.

In one embodiment, all of the access commands in the command queue are evaluated by the RPO algorithm, for example, by ordering all of the access commands according to an increasing access cost as shown in FIG. 5B or 6B. In an alternative embodiment, the RPO algorithm may evaluate a subset of the access commands in the command queue. For example, in one embodiment, the RPO algorithm may sort the access commands into bins according to the rotation latency from the current access command. The RPO algorithm may then evaluate only the access commands that fall within a range of rotation latency from the current access command. That is, the RPO algorithm may order the selected subset of access commands according to an increasing access cost as shown in FIG. 5B or 6B. Also in this embodiment, the step of ordering the access commands according to the access cost may be skipped since only a subset of the access commands are considered (all access commands within the subset are evaluated rather than terminate the search early at step 64 of FIG. 5A or 6A).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of tracks, wherein each track comprises a plurality of data sectors and a plurality of servo sectors;
    a head actuated over the disk; and
    control circuitry operable to:
        receive a plurality of access commands from a host, wherein each access command identifies a target track;
        store the access commands in a command queue;
        generate an access cost for at least a first and second access command in the command queue, wherein each access cost comprises a seek length and a rotation latency; and
        choose a next access command to execute from the command queue by:
            selecting a first access command from the command queue having a first access cost;
            defining a window relative to the first access cost and a first risk based penalty (RBP) of the first access command, wherein the first RBP represents a probability of missing a first data sector of the first access command;
            selecting a second access command from the command queue comprising a second access cost within the window; and
            choosing between the first access command and the second access command in response to a second RBP of the second access command, wherein the second RBP represents a probability of missing a first data sector of the second access command.

2. The disk drive as recited in claim 1, wherein the first access cost, first RBP, second access cost, and second RBP comprise a number of servo wedges defined by the servo sectors.

3. The disk drive as recited in claim 1, wherein the control circuitry is further operable to generate the first RBP based on a ratio of seek misses to a total number of seeks for the seek length of the first access command.

4. The disk drive as recited in claim 3, wherein the control circuitry is further operable to generate the first RBP based on the ratio of seek misses to the total number of seeks for the seek length of the first access command and for the rotation latency of the first access command.

5. The disk drive as recited in claim 4, wherein the control circuitry is further operable to update the first RBP after executing the first access command.

6. The disk drive as recited in claim 1, wherein the control circuitry is further operable to choose the second access command when the second access cost plus the second RBP is less than the first access cost plus the first RBP.

7. The disk drive as recited in claim 1, wherein the control circuitry is further operable to choose the second access command when the second RBP is less than the first RBP.

8. A method of operating a disk drive comprising a head actuated over a disk comprising a plurality of tracks, wherein each track comprises a plurality of data sectors and a plurality of servo sectors, the method comprising:
    receiving a plurality of access commands from a host, wherein each access command identifies a target track;
    storing the access commands in a command queue;
    generating an access cost for at least a first and second access command in the command queue, wherein each access cost comprises a seek length and a rotation latency; and
    choosing a next access command to execute from the command queue by:
        selecting a first access command from the command queue having a first access cost;
        defining a window relative to the first access cost and a first risk based penalty (RBP) of the first access command, wherein the first RBP represents a probability of missing a first data sector of the first access command;
        selecting a second access command from the command queue comprising a second access cost within the window; and
        choosing between the first access command and the second access command in response to a second RBP of the second access command, wherein the second RBP represents a probability of missing a first data sector of the second access command.

9. The method as recited in claim 8, wherein the first access cost, first RBP, second access cost, and second RBP comprise a number of servo wedges defined by the servo sectors.

10. The method as recited in claim 8, further comprising generating the first RBP based on a ratio of seek misses to a total number of seeks for the seek length of the first access command.

11. The method as recited in claim 10, further comprising generating the first RBP based on the ratio of seek misses to the total number of seeks for the seek length of the first access command and for the rotation latency of the first access command.

12. The method as recited in claim 11, further comprising updating the first RBP after executing the first access command.

13. The method as recited in claim 8, further comprising choosing the second access command when the second access cost plus the second RBP is less than the first access cost plus the first RBP.

14. The method as recited in claim 8, further comprising choosing the second access command when the second RBP is less than the first RBP.

\* \* \* \* \*